US012192848B2

(12) United States Patent
Lowe

(10) Patent No.: US 12,192,848 B2
(45) Date of Patent: *Jan. 7, 2025

(54) LOCATION-BASED MESSAGING

(71) Applicant: Capital One Services, LLC, McLean, VA (US)

(72) Inventor: Kevin M. Lowe, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,143

(22) Filed: May 23, 2023

(65) Prior Publication Data

US 2023/0300566 A1 Sep. 21, 2023

Related U.S. Application Data

(63) Continuation of application No. 17/446,578, filed on Aug. 31, 2021, now Pat. No. 11,722,836.

(51) Int. Cl.
*H04W 4/021* (2018.01)
*H04W 4/20* (2018.01)

(52) U.S. Cl.
CPC .......... *H04W 4/021* (2013.01); *H04W 4/022* (2013.01); *H04W 4/20* (2013.01)

(58) Field of Classification Search
None
See application file for complete search history.

(56) References Cited

U.S. PATENT DOCUMENTS

| 8,090,358 | B2 | 1/2012 | Sherman et al. | |
|---|---|---|---|---|
| 10,089,630 | B2 | 10/2018 | Clyne | |
| 10,332,150 | B2 | 6/2019 | Hannan | |
| 2007/0055630 | A1* | 3/2007 | Gauthier | G06Q 20/24 705/44 |
| 2009/0076896 | A1 | 3/2009 | DeWitt et al. | |
| 2009/0076925 | A1 | 3/2009 | DeWitt et al. | |
| 2010/0274627 | A1 | 10/2010 | Carlson | |
| 2013/0090959 | A1* | 4/2013 | Kvamme | G06Q 10/02 705/5 |
| 2014/0213300 | A1* | 7/2014 | Spears | H04W 4/024 455/456.3 |
| 2014/0221095 | A1* | 8/2014 | MacNaughton | A63F 13/215 463/35 |

(Continued)

*Primary Examiner* — Ernest G Tacsik
(74) *Attorney, Agent, or Firm* — Harrity & Harrity, LLP

(57) ABSTRACT

In some implementations, a system may receive exchange data that includes a credential for an exchange and an indication of an entity associated with the exchange. The system may determine that an entity location is within a threshold distance of a target location included in a set of target locations. The system may determine a baseline location associated with a user. The system may determine that the baseline location is outside of a threshold proximity of all target locations included in the set of target locations. The system may transmit, to a mobile device associated with the user, a message that includes an indication of the target location based on determining that the entity location is within the threshold distance of the target location and based on determining that the baseline location is outside of the threshold proximity of all target locations included in the set of target locations.

20 Claims, 7 Drawing Sheets

(56) References Cited

U.S. PATENT DOCUMENTS

| | | | |
|---|---|---|---|
| 2016/0132870 A1* | 5/2016 | Xu | G06Q 20/382 |
| | | | 705/21 |
| 2017/0357971 A1* | 12/2017 | Pitz | H04W 4/021 |
| 2019/0370858 A1* | 12/2019 | Bennett | G06Q 20/3224 |
| 2021/0125169 A1* | 4/2021 | Berdugo | G06Q 20/3278 |
| 2023/0066933 A1 | 3/2023 | Lowe | |

* cited by examiner

LOCATION-BASED MESSAGING

RELATED APPLICATION

This application is a continuation of U.S. patent application Ser. No. 17/446,578, filed Aug. 31, 2021, which is incorporated herein by reference in its entirety.

BACKGROUND

Location-based messaging can be used to establish a real-time communication channel between two parties based on a location of a mobile device. For example, the mobile device may periodically transmit its location to a server, and the server may transmit a push notification to the mobile device if the mobile device is located within a particular geographic area. Location-based messaging techniques may use coordinates determined based on a global navigation satellite system (GNSS), such as the Global Positioning System (GPS).

SUMMARY

Some implementations described herein relate to a system for location-based messaging. The system may include one or more memories and one or more processors communicatively coupled to the one or more memories. The one or more processors may be configured to receive exchange data, associated with an exchange, that includes a credential and an indication of an entity associated with the exchange. The one or more processors may be configured to determine that a location of the entity is within a threshold distance of a target location of a particular type. The one or more processors may be configured to determine one or more baseline locations of a user associated with the credential. The one or more processors may be configured to determine that the one or more baseline locations are outside of a threshold proximity of all target locations of the particular type. The one or more processors may be configured to identify, based on the credential, contact information for the user based on determining that the location of the entity is within the threshold distance of the target location of the particular type and based on determining that the one or more baseline locations are outside of the threshold proximity of all target locations of the particular type. The one or more processors may be configured to transmit a message, using the contact information, that includes an indication of the target location of the particular type.

Some implementations described herein relate to a method for location-based messaging. The method may include receiving, by a system, exchange data that includes a credential for an exchange and an indication of an entity associated with the exchange. The method may include determining, by the system, that an entity location, associated with the entity and the exchange, is within a threshold distance of a target location included in a set of target locations. The method may include determining, by the system, a baseline location associated with a user that is associated with the credential, wherein the baseline location is different from the entity location. The method may include determining, by the system, that the baseline location is outside of a threshold proximity of all target locations included in the set of target locations. The method may include transmitting, by the system and to a mobile device associated with the user, a message that includes an indication of the target location based on determining that the entity location is within the threshold distance of the target location and based on determining that the baseline location is outside of the threshold proximity of all target locations included in the set of target locations.

Some implementations described herein relate to a non-transitory computer-readable medium that stores a set of instructions for location-based messaging for a system. The set of instructions, when executed by one or more processors of the system, may cause the system to receive exchange data that includes a credential for an exchange and an indication of an entity location associated with the exchange. The set of instructions, when executed by one or more processors of the system, may cause the system to determine that a distance between the entity location and a target location, included in a set of target locations, is less than or equal to a threshold. The set of instructions, when executed by one or more processors of the system, may cause the system to determine a baseline location associated with the credential. The set of instructions, when executed by one or more processors of the system, may cause the system to determine that the baseline location is outside of a threshold proximity of all target locations included in the set of target locations. The set of instructions, when executed by one or more processors of the system, may cause the system to transmit, using contact information associated with the credential, a message that identifies the target location based on determining that the distance between the entity location and the target location is less than or equal to the threshold and based on determining that the baseline location is outside of the threshold proximity of all target locations included in the set of target locations.

DETAILED DESCRIPTION

Figure 1A:
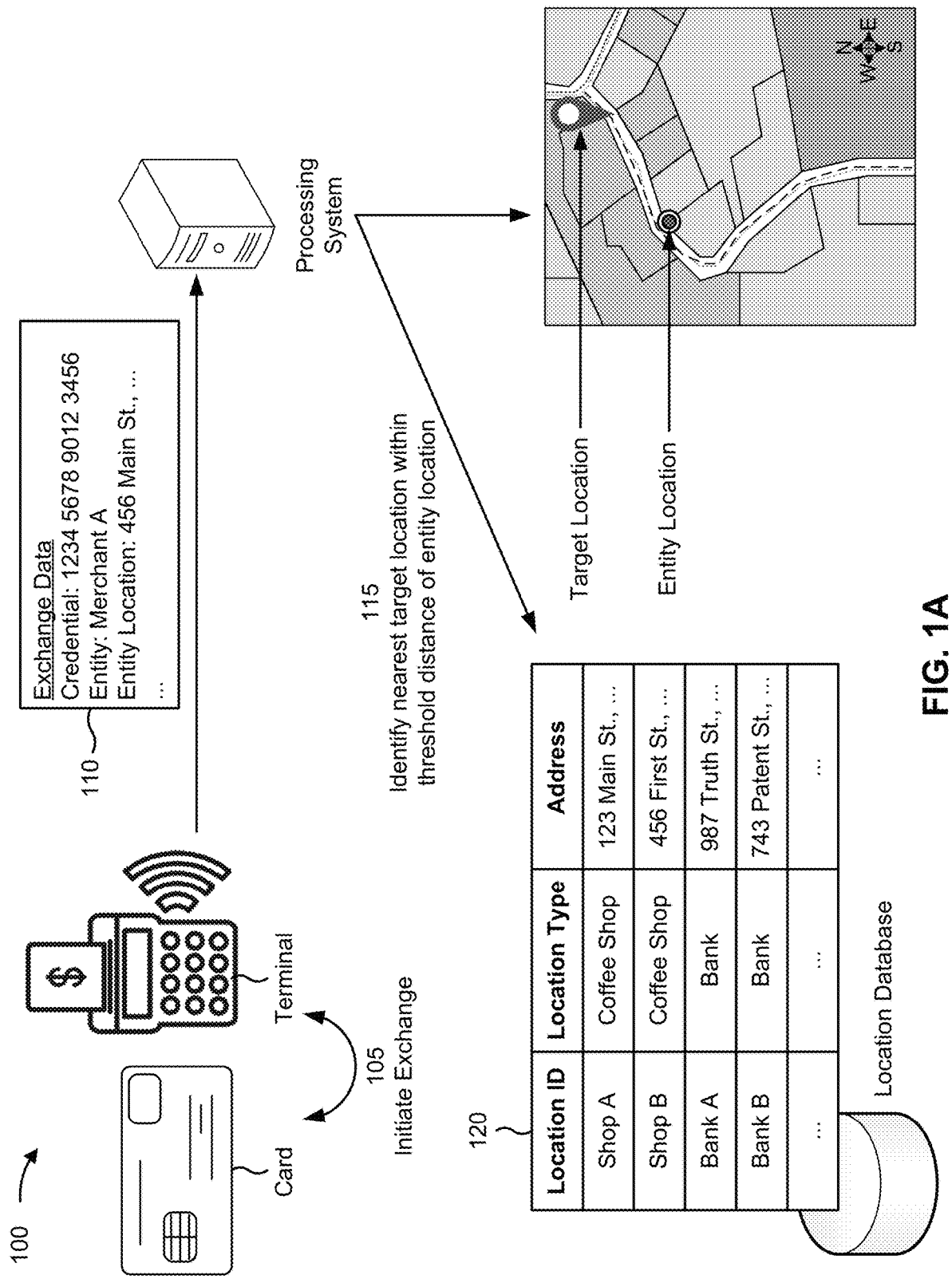
FIGS. 1A-1D are diagrams of an example implementation relating to location-based messaging.

The following detailed description of example implementations refers to the accompanying drawings. The same reference numbers in different drawings may identify the same or similar elements.

Location-based messaging can be used to establish a real-time communication channel between two parties based on a location of a mobile device. For example, the mobile device may periodically transmit its location to a server, and the server may transmit a push notification to the mobile device if the mobile device is located within a particular geographic area. By transmitting notifications only to mobile device located in a particular geographic area (rather than to all mobile devices or a larger set of mobile devices), location-based messaging conserves radio frequency resources (e.g., time domain resources and frequency domain resources) that are used for telecommunication.

Some location-based messaging techniques use coordinates determined based on a global navigation satellite system (GNSS), such as the Global Positioning System (GPS). For example, GPS hardware on a mobile device may determine GPS coordinates that indicate a location of the mobile device, such as by receiving signals from GPS satellites and calculating the GPS coordinates of the mobile device based on those signals. However, determining a location of a mobile device using GPS can be unreliable because a GPS receiver of the mobile device (or the mobile device itself) may be turned off or the mobile device may not be able to receive signals from a sufficient number of GPS satellites to accurately calculate the location (e.g., due to obstructions or being located in a poor coverage area). Furthermore, performing periodic GPS measurements, calculating GPS coordinates, and transmitting those GPS coordinates to a server consumes processing resources, memory resources, and battery power of the mobile device. Also, transmission of GPS coordinates by the mobile device consumes radio frequency resources and makes those resources unavailable for other communications.

Some location-based messaging techniques use base station trilateration, where the mobile device receives signals from at least three base stations (sometimes called cell towers), and calculates a location of the mobile device based on those signals. However, similar to GPS-based location determination, trilateration using base station signals is not possible (or is inaccurate) if the mobile device is in a poor coverage area (e.g., not within range of at least three base stations). Furthermore, base station trilateration consumes resources of the mobile device (e.g., processing resources, memory resources, and battery power) and consumes radio frequency resources for transmission of an indication of the location to a server. Also, both GPS-based location determination and base station trilateration require the use of a mobile device, which a user may sometimes not carry.

Some location-based techniques use sensors (e.g., Internet of Things (IoT) sensors or devices) to determine the location of a mobile device, such as by monitoring for and/or receiving signals from the mobile device. However, this requires large-scale deployment of IoT devices, and location determination using IoT is not possible unless IoT sensors are deployed in a location where the mobile device is present. This also requires the use of a mobile device, may require the use of RF resources for communication via a cellular network to indicate the location, and consumes resources of the IoT sensors.

Some techniques described herein use exchange data (sometimes called transaction data) to determine a location of a user and to control transmission of messages to a mobile device of the user. For example, the user may perform an exchange (e.g., a transaction) at an entity location (e.g., at a particular merchant or an automated teller machine (ATM)), and a transaction terminal may transmit exchange data, associated with the exchange, to a processing system. The processing system may determine a location of the user based on the exchange data, and may trigger transmission of a message to a mobile device, associated with the user, if certain conditions are satisfied. By using exchange data for location determination (e.g., rather than GPS or base station trilateration), a location of the user can be determined regardless of whether the user is carrying a mobile device, regardless of whether the mobile device is powered on, regardless of whether a GPS receiver of the mobile device is powered on, and regardless of whether the mobile device is in a location with sufficient GPS satellite coverage or base station coverage to perform trilateration. Thus, using exchange data for location determination can be more reliable than GPS or base station trilateration and can be used for location determination in scenarios where GPS or base station trilateration is inaccurate or impossible. Furthermore, using exchange data for location determination conserves resources of the mobile device (e.g., processing resources, memory resources, and battery power) that are otherwise used to perform GPS or base station trilateration. Also, using exchange data for location determination conserves radio frequency resources that would otherwise be used for transmission of coordinates or other location data from the mobile device to a server (e.g., via a base station with which the mobile device communicates) if GPS or base station trilateration were to be used.

Some techniques described herein only transmit a message to the mobile device if a condition is satisfied, such as the mobile device being located in a particular geographic area. This conserves radio frequency resources (e.g., time domain resources and frequency domain resources) that are used for telecommunication. Also, some techniques described herein further conserve radio frequency resources by further limiting the situations in which a message is transmitted to the mobile device, as will be described in more detail elsewhere herein.

FIGS. 1A-1D are diagrams of an example implementation 100 associated with location-based messaging. As shown in FIGS. 1A-1D, example implementation 100 includes a card (e.g., a transaction card, which is an example of a transaction device), a terminal (e.g., a transaction terminal), a processing system, a location database, a user profile database, and a mobile device. These devices are described in more detail below in connection with FIG. 2 and FIG. 3.

As shown in FIG. 1A, and by reference number 105, the card and the terminal may interact to initiate an exchange (sometimes called a transaction or a purchase). For example, a user may swipe, insert, or tap the card to the terminal to pay for an item or a service. Although FIG. 1A shows a card being used for the exchange, another transaction device may be used for the exchange in some implementation, such as a mobile device (e.g., a phone with a digital wallet or e-wallet application).

As shown by reference number 110, the terminal may transmit exchange data (sometimes called transaction data) to the processing system. The processing system may include one or more systems (e.g., one or more servers), such as a transaction backend system and a location system. For the purpose of the description of example implementation 100, operations that may be performed by separate devices are described as being performed by the processing system.

The exchange data may include one or more credentials associated with the user (e.g., a cardholder or accountholder) and/or the card, such as an account number (e.g., a card number, such as a credit card number or a debit card number, shown as "1234 5678 9012 3456"), an expiration date, and/or a card verification value (CVV), which is sometimes called a card verification number (CVN) or a card verification code (CVC). The processing system may use the one or more credentials to authenticate the exchange and/or identify an account to be charged for the exchange. Additionally, or alternatively, the exchange data may include an indication of an entity associated with the exchange (e.g., an entity from which an item or service is purchased), sometimes called a merchant. For example, the exchange data may include an entity identifier (e.g., a merchant identifier), such as a name or a code associated with the entity (shown as "Merchant A").

In some implementations, the exchange data may include an indication of a location of the entity, sometimes referred to herein as an "entity location" (or alternatively, a merchant location, shown as "456 Main St."). In some examples, the entity location may be directly indicated in the exchange data, such as by using an entity location identifier (e.g., a location code) or a geographic location identifier (e.g., an address, a zip code, or a postal code). Additionally, or alternatively, the processing system may determine the entity location based on the indication of the entity included in the exchange data, such as by searching a data structure (e.g., a location database) to identify the entity location using the indication of the entity. The entity location may include, for example, a location of a merchant, a location of a store, or a location of an ATM.

In some implementations, the exchange data may include other information, such as an exchange amount (e.g., an amount in dollars or another currency, sometimes called a transaction amount), a date of the exchange, and/or a time of the exchange. This information may be used by the processing system to process the transaction (e.g., to debit and/or credit appropriate accounts based on the exchange amount).

As shown by reference number 115, the processing system may identify a nearest target location, from a set of target locations (e.g., compared to all other target locations in the set), that is within a threshold distance of the entity location. A target location may be a physical location of a particular type, such as a location of a particular entity (e.g., a particular merchant) or a location of a particular type of entity (e.g., categorized in a particular entity category or merchant category, such as a bank, a coffee shop, or a hybrid location that incorporates aspects of a bank and a coffee shop). For example, the target location may be a location of a coffee shop associated with a particular brand name (e.g., a coffee shop of a particular merchant) or a location of a coffee shop not associated with a particular brand name (e.g., any coffee shop or a coffee shop of any merchant).

As shown by reference number 120, in some implementations, the processing system may search a data structure (e.g., shown as a location database) to identify the nearest target location, included in the set of target locations, that is within a threshold distance of the entity location. Additionally, or alternatively, the processing system may search the data structure to determine whether there are any target locations within a threshold distance of the entity location. The data structure may store location data for a set of target locations. As shown, the location data may include, for example, a location identifier that uniquely identifies a target location, a location type indicator that indicates a type of the target location (e.g., an entity type or a merchant type), and/or a geographic location indicator that indicates a geographic location of the target location (e.g., an address). For example, a target location having a location identifier (ID) of "Shop A" has a location type of "Coffee Shop" and an address of "123 Main St."

The processing system may use a query (e.g., a database query) to identify the nearest target location that is within the threshold distance of the entity location. For example, the query may include a search parameter that indicates a particular location type, which may limit the search results to only target locations of the particular location type. In some implementations, the processing system may use user profile data to determine a location type to be searched for a particular user. For example, the user profile data may indicate that coffee shops are relevant to the user, and/or may indicate that banks are not relevant to the user, and the processing system may narrow the search accordingly to only search for relevant location types. Additionally, or alternatively, the processing system may use historical exchange data to determine location types that are relevant to the user. For example, if a user has used one or more credentials to perform a threshold quantity of transactions at a particular location type within a time period, then the processing system may determine that the particular location type is relevant to the user. In some implementations, this determination may be performed periodically and relevant location types may be stored in the user profile data. Thus, the processing system may identify a target location or a type of target location based on the credential (or a user profile associated with the credential), and different credentials (or different user profiles) may be associated with different types of target locations. Additionally, or alternatively, the query may indicate the entity location (e.g., address, zip code, or the like), which may be used to return a target location that is located nearest to the entity location.

As an example, a user profile associated with the credential 1234 5678 9012 3456 may indicate that coffee shops are relevant to the user (e.g., coffee shops associated with a particular merchant). Based on this user profile data, the processing system may perform a search, based on a location type of coffee shop and the entity location of 456 Main St., to determine that Shop A, with an address of 123 Main St., is the nearest coffee shop (of the particular merchant) to the entity location of 456 Main St.

After identifying the nearest target location having a relevant location type, the processing system may then determine a distance between the entity location and the nearest target location, such as by using stored navigation data, performing a web search, performing a database search, or the like. The processing system may determine whether the nearest target location is within a threshold distance of the entity location (e.g., whether the distance between the nearest target location and the entity location is less than or equal to a threshold). If the nearest target location is within the threshold distance of the entity location, then the processing system may proceed with performing one or more operations described below in connection with FIGS. 1B-1D. If the nearest target location is not within the threshold distance of the entity location, then the processing system may refrain from performing further processing, which conserves computing resources of the processing system (e.g., processing resources and memory resources), and also conserves radio frequency resources by preventing transmission of an irrelevant message to a mobile device.

In some implementations, the processing system may identify the threshold distance based on information stored in a data structure. In some implementations, the threshold distance may be the same for all entity locations and/or target locations. Alternatively, different entity locations and/or target locations (or target location types) may be associated with different threshold distances. For example, a larger threshold distance may be used for entity locations and/or target locations in rural areas, whereas a smaller threshold distance may be used for entity locations and/or target locations in urban areas. In some implementations, a data structure may store information that indicates a correspondence between a geographic area (e.g., a city or a zip code) and a threshold distance to be used by the processing system when identifying target locations in that geographic area and/or when identifying target locations located nearest to an entity location in that geographic area.

Additionally, or alternatively, different threshold distances may be used for different location types (e.g., a small threshold distance for a coffee shop and a larger threshold distance for a bank). In some implementations, a data structure may store information that indicates a correspondence between a location type and a threshold distance to be used by the processing system when identifying the target location of that location type. In some implementations, the processing system may use a combination of two or more of the entity location, the target location, or the target location type to determine the threshold distance (e.g., based on a stored threshold distance value and a stored scaling factor for the entity location, the target location, and/or the target location type).

In some implementations, the processing system may track information regarding a success rate of messages, such as a threshold distance used to determine whether to transmit a message and an indication of whether the message resulted in a user visit to the target location (as described in more detail below). The processing system may use different threshold distances in connection with different messages, may track corresponding success rates, and may use this information to select a threshold distance to be used for future messages (e.g., based on the threshold distance that results in the highest success rate). Thus, the processing system may use correlations between historical messages and user visits to target locations (e.g., as indicated by the user scheduling a meeting with an employee of the target location or using the credential to perform a transaction at the target location) to determine the threshold distance.

Figure 1B:
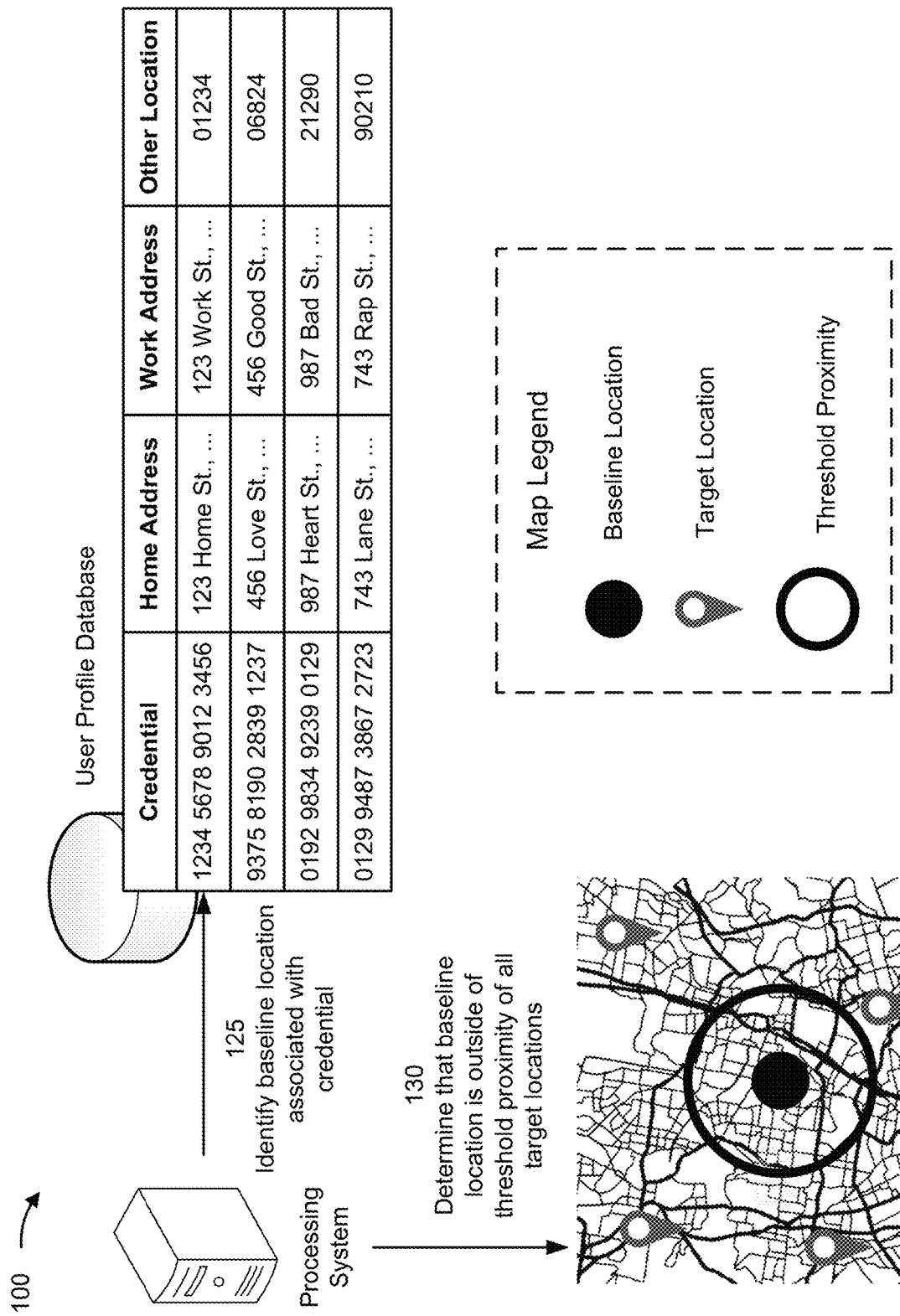

As shown in FIG. 1B, and by reference number 125, the processing system may identify one or more baseline locations associated with the credential (or the user, who may be associated with the credential and/or one or more other credentials). A baseline location, for a user associated with the credential, may be a location where the user is often located, such as a home location of the user (e.g., based on the user's home address), a work location of the user (e.g., based on the user's work address), and/or a geographic location derived from historical exchange data of the user (e.g., where the credential or other credentials associated with the user have been used for a threshold quantity of exchanges, such as within a time period). Thus, the baseline location may be different from the entity location described above. In some implementations, the processing system may search a data structure (shown as a user profile database) to identify the baseline location. For example, the processing system may search the user profile database using the credential to identify a home address associated with the credential, a work address associated with the credential, and/or one or more other baseline locations associated with the credential (e.g., locations where the credential has been used a threshold number of times, such as within some recent time frame). In implementation 100, the credential "1234 5678 9012 3456" is associated with a first baseline location (a home address) of "123 Home St.," a second baseline location (a work address) of "123 Work St.," and a third baseline location (e.g., where the credential is commonly used to perform transactions with a card present) represented by a zip code of "01234."

As shown by reference number 130, the processing system may determine whether the one or more baseline locations are outside of a threshold proximity of all target locations of a particular type. For example, the processing system may identify a relevant target location type (as described above in connection with FIG. 1A), and may search a data structure (e.g., the location database described elsewhere herein) to identify a nearest target location, of a set of target locations of the relevant location type (e.g., compared to all other target locations in the set), to the baseline location.

The processing system may use a query (e.g., a database query) to identify the nearest target location to the baseline location. For example, the query may include a search parameter that indicates a particular location type, which may limit the search results to only target locations of the particular location type. In some implementations, the processing system may use user profile data and/or historical exchange data to determine a location type to be searched for a particular user (associated with a credential), as described above. Additionally, or alternatively, the query may indicate the baseline location (e.g., address, zip code, or the like), which may be used to return a target location that is located nearest to the baseline location.

After identifying the nearest target location having a relevant location type, the processing system may then determine a distance between the baseline location and the nearest target location, such as by using stored navigation data, performing a web search, performing a database search, or the like. The processing system may determine whether the nearest target location is within a threshold distance of the baseline location (e.g., whether the distance between the nearest target location and the entity location is less than or equal to a threshold, or whether the nearest target location is outside of a threshold proximity to the baseline location). If the nearest target location is not within the threshold distance of the baseline location, then the processing system may proceed with performing one or more operations described below in connection with FIGS. 1C-1D. If the nearest target location is within the threshold distance of the baseline location, then the processing system may refrain from performing further processing, which conserves computing resources of the processing system (e.g., processing resources and memory resources), and also conserves radio frequency resources by preventing transmission of an irrelevant message to a mobile device. In this way, relevant location-based messages may be sent to the mobile device of a user who is not normally located within a threshold proximity of a particular location type, and that has traveled to a location that is within a threshold proximity of the particular location type.

In some implementations, after determining that the baseline location(s) are outside of a threshold proximity of all target locations (e.g., of a particular type), the processing system may store and/or update a flag stored in the user profile in connection with a user and/or a credential. For example, the processing system may transmit an instruction to cause a value of the flag to be set to particular value in the user profile database. A value of the flag may indicate whether all of the baseline locations associated with the user (or the credential) are outside of the threshold proximity of all target locations of the particular type. Then, when the processing system is triggered to determine whether the baseline location(s) are outside of the threshold proximity of all target locations, the processing system may first check a value of the flag. A first value (e.g., 0) may indicate that at least one baseline location associated with the user (or the credential) is within the threshold proximity, a second value (e.g., 1) may indicate that all of the baseline locations associated with the user (or the credential) are outside of the threshold proximity, and a third value (e.g., 2, or a default value) may indicate that it is not known whether the baseline location(s) are within or outside of the threshold proximity.

In this example, if the value of the flag indicates that at least one baseline location associated with the user is within the threshold proximity, then the processing system may refrain from performing further processing, which conserves computing resources of the processing system (e.g., processing resources and memory resources), and also conserves radio frequency resources by preventing transmission of an irrelevant message to a mobile device. If the value of the flag indicates that all of the baseline locations associated with the user are outside of the threshold proximity, then the processing system may proceed with performing one or more operations described below in connection with FIGS. 1C-1D. If the value of the flag indicates that it is not known whether the baseline location(s) are within or outside of the threshold proximity, then the processing system may search the data structure, as described above, to determine whether the baseline location(s) are within or outside of the threshold proximity, and may update the flag accordingly. By using this flag, computing resources associated with performing the database query can be conserved.

If the processing system identifies a single baseline location associated with a user (e.g., a home address), then the processing system may perform the operations described in connection with FIG. 1B for the single baseline location. In this case, if the baseline location is outside of the threshold proximity of all target locations, then the processing system may proceed with performing one or more operations described below in connection with FIGS. 1C-1D. If the baseline location is within the threshold distance of at least one target location, then the processing system may refrain from performing further processing, which conserves computing resources of the processing system (e.g., processing resources and memory resources), and also conserves radio frequency resources by preventing transmission of an irrelevant message to a mobile device. In this way, relevant location-based messages may be sent to the mobile device of a user who is not normally located within a threshold proximity of a particular location type, and that has traveled to a location that is within a threshold proximity of the particular location type.

If the processing system identifies multiple baseline locations associated with a user (e.g., a home address, a word address, and/or another location), then the processing system may perform the operations described in connection with FIG. 1B for each baseline location of the multiple baseline locations. In this case, if all of the baseline locations are outside of the threshold proximity of all target locations, then the processing system may proceed with performing one or more operations described below in connection with FIGS. 1C-1D. If at least one of the baseline locations, of the multiple baseline locations, is within the threshold distance of at least one target location, then the processing system may refrain from performing further processing, which conserves computing resources of the processing system (e.g., processing resources and memory resources), and also conserves radio frequency resources by preventing transmission of an irrelevant message to a mobile device. In this way, relevant location-based messages may be sent to the mobile device of a user who is not normally located within a threshold proximity of a particular location type, and that has traveled to a location that is within a threshold proximity of the particular location type.

In some implementations, the processing system may identify the threshold proximity based on information stored in a data structure. In some implementations, the threshold proximity may be the same for all baseline locations and/or target locations. Alternatively, different baseline locations and/or target locations (or target location types) may be associated with different threshold proximities. For example, a larger threshold proximity may be used for baseline locations and/or target locations in rural areas, whereas a smaller threshold proximity may be used for baseline locations and/or target locations in urban areas. In some implementations, a data structure may store information that indicates a correspondence between a geographic area (e.g., a city or a zip code) and a threshold proximity to be used by the processing system when determining whether a baseline location, located in that geographic area, is within the threshold proximity of a target location.

Additionally, or alternatively, different threshold proximities may be used for different location types (e.g., a small threshold proximity for a coffee shop and a larger threshold proximity for a bank). In some implementations, a data structure may store information that indicates a correspondence between a location type and a threshold proximity to be used by the processing system. In some implementations, the processing system may use a combination of two or more of the baseline location, the target location, or the target location type to determine the threshold proximity (e.g., based on a stored threshold distance value and a stored scaling factor for the baseline location, the target location, and/or the target location type).

In some implementations, the processing system may track information regarding a success rate of messages, such as a threshold proximity used to determine whether to transmit a message and an indication of whether the message resulted in a user visit to the target location (as described in more detail below). The processing system may use different threshold proximities in connection with different messages, may track corresponding success rates, and may use this information to select a threshold proximity to be used in connection with future messages (e.g., based on the threshold proximity that results in the highest success rate). Thus, the processing system may use correlations between historical messages and user visits to target locations to determine the threshold proximity.

The processing system is described above as performing a first determination of whether the entity location is within a threshold distance of a target location, and then performing a second determination of whether a baseline location of the user is outside of a threshold proximity of all target locations. In some cases, performing the operations in this order may conserve computing resources, such as if there are multiple baseline locations for which a search is to be performed. In such cases, if the processing system determines that the entity location is not within a threshold distance of a target location, then the processing system may conserve computing resources by refraining from performing the second determination (which may be more computationally expensive than the first determination in this case).

However, in some implementations, the processing system may perform the second determination before the first determination. In other words, the processing system may first determine whether a baseline location of the user is outside of a threshold proximity of all target locations, and may then determine whether the entity location is within a threshold distance of a target location. In some cases, performing the operations in this order may conserve computing resources, such as if there is a single baseline location for which a search is to be performed, or if the processing system uses the flag-based determination described above. In such cases, if the processing system determines that the baseline location(s) are outside of the threshold proximity of all target locations, then the processing system may conserve computing resources by refraining from performing the first determination (which may be more computationally expensive than the second determination in this case).

Figure 1C:
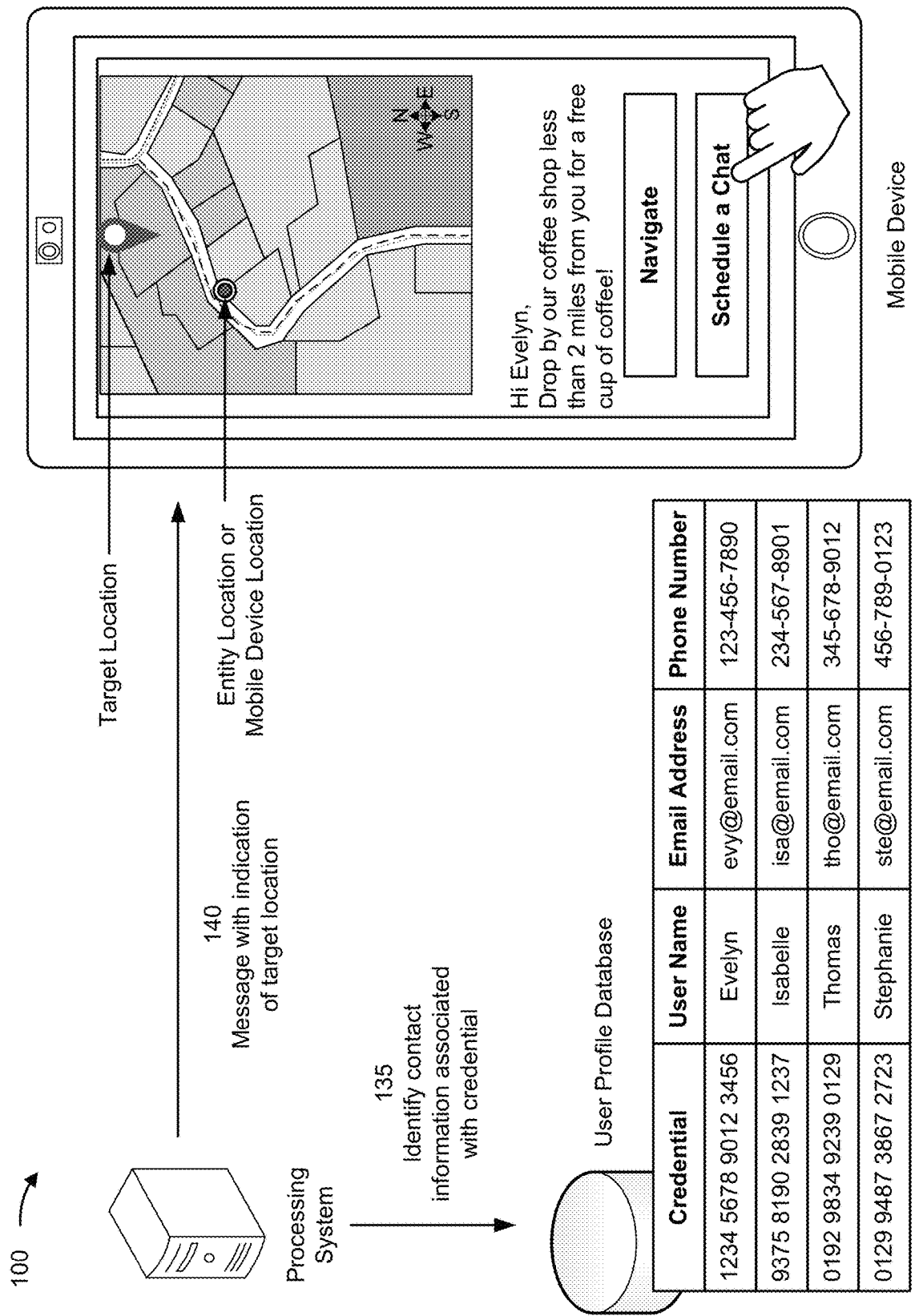

As shown in FIG. 1C, and by reference number 135, the processing system may identify contact information associated with the credential and/or the user. For example, the processing system may query a data structure (e.g., the user profile database, as shown), using the credential (or a user identifier of a user associated with the credential), to identify the contact information. The contact information may include, for example, a phone number (e.g., of a mobile device), an email address, a username associated with an application installed on a mobile device of the user, or the like.

In some implementations, the processing system may identify the contact information (and transmit a message using the contact information) only if the entity location is within a threshold distance of the target location (of a particular type) and only if the baseline location is outside of a threshold proximity of all target locations (of the particular type). As a result, computing resources of the processing system may be conserved by only identifying the contact information if these conditions are satisfied.

As shown by reference number 140, the processing system may transmit a message, using the contact information, that includes an indication of the target location. For example, the processing system may generate and/or transmit a message (e.g., a simple messaging service (SMS) message or a multimedia messaging service (MMS) message) to a mobile device of the user, such as via a telecommunications core network and/or a base station. As another example, the processing system may generate and transmit an email message and/or an in-application message associated with an application installed on the mobile device. The message may indicate the target location, such as by indicating the target location on a map, indicating an address of the target location, indicating a name of the target location (e.g., an entity name or merchant name), indicating a distance between the entity location and the target location, indicating a distance between the mobile device and the target location (e.g., using GPS or another location-based service), or the like.

In the example shown in FIG. 1C, the example message (e.g., an MMS message or an in-application message) includes an image of a map that includes a representation of a location of the mobile device (e.g., using GPS) and a representation of the target location. The message also includes text with a name of the user (e.g., obtained from the user profile database), a location type or a name of the target location (e.g., a coffee shop), a distance to the target location (e.g., less than 2 miles), and/or other information (e.g., a link or code to a promotion or coupon that can be redeemed at the target location). In some implementations, the message may include a user interface element (e.g., a link or a button) with which the user can interact to cause the mobile device to output navigation instructions to the target location (e.g., shown as a "Navigate" button). Additionally, or alternatively, the message may include a user interface element with which the user can interact to cause one or more scheduling operations to be performed in connection with the target location, as described below in connection with FIG. 1D.

In some implementations, after transmitting the message, the processing system may store a messaging indicator in connection with the user profile of the user. The messaging indicator may indicate that a location-based message has been transmitted in connection with the user (e.g., to a mobile device of the user), a date of a most recent location-based message transmitted in connection with the user, a time of a most recent location-based message transmitted in connection with the user, or the like. In some implementations, prior to transmitting a subsequent message in connection with the user, the processing system may read the messaging indicator to determine whether to transmit the subsequent message. For example, the processing system may refrain from transmitting the message until a threshold amount of time has elapsed since a most recent message. This conserves computing resources and RF resources associated with generating and transmitting the message.

Figure 1D:
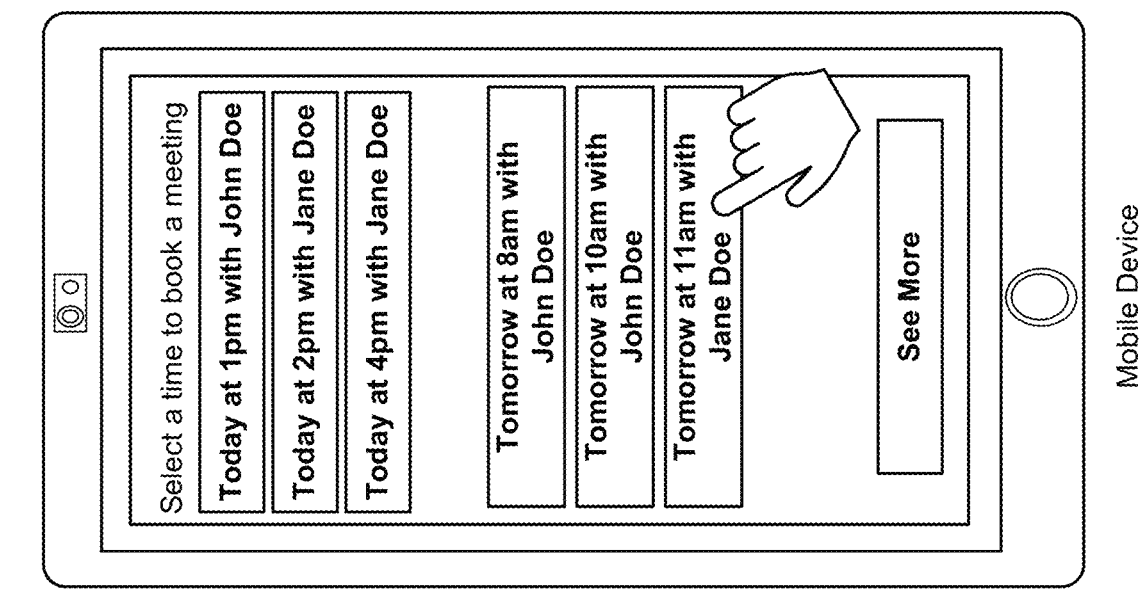
Figure 1D:
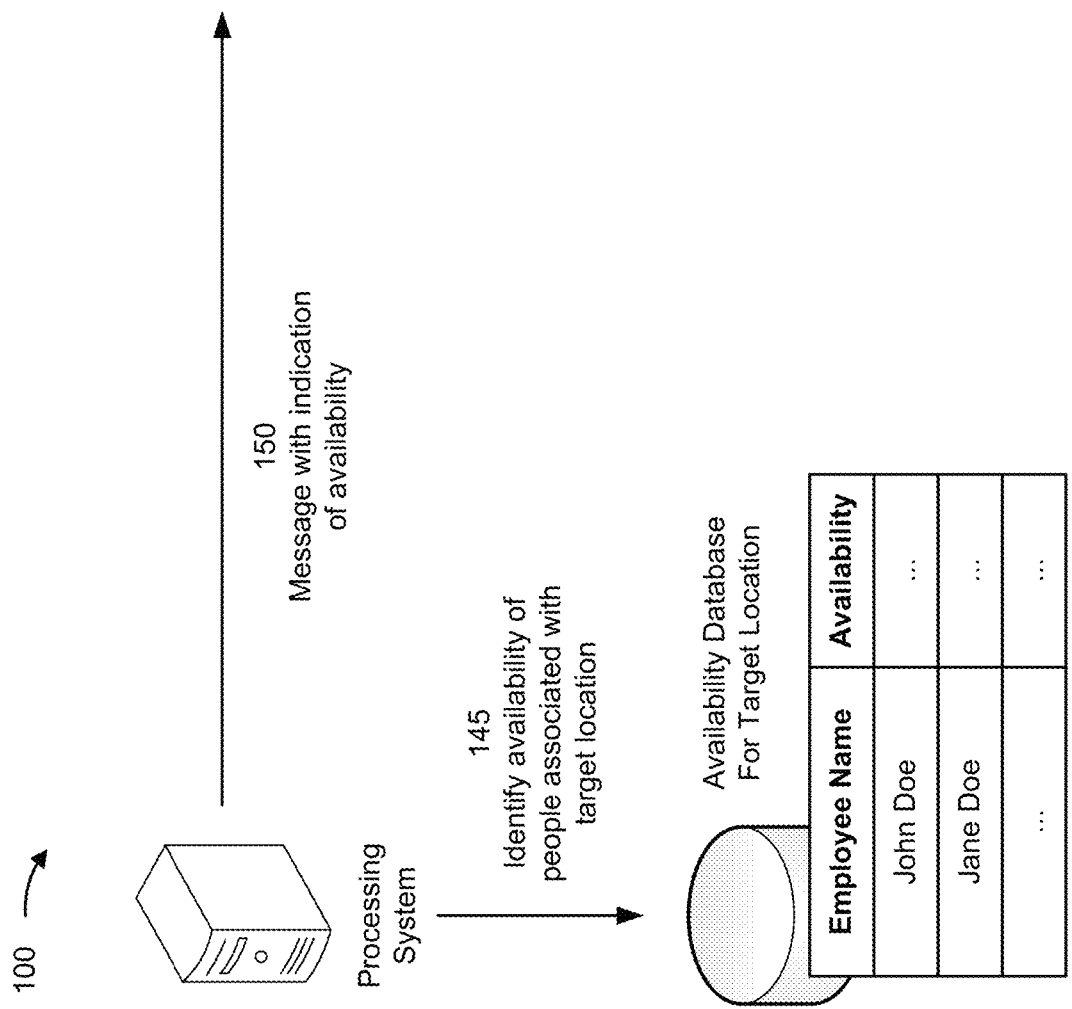

As shown in FIG. 1D, and by reference number 145, the processing system may query a data structure (shown as an availability database) to determine availability of a person (e.g., an employee) associated with the target location. For example, a user of the mobile device may interact with a user interface element to request scheduling of a meeting with an employee of the target location. The mobile device may notify the processing system of the request based on the user interaction with the user interface element, and the processing system may query the data structure based on receiving the request. The mobile device may indicate the target location to the processing system, or may include information in the message (e.g., contact information) based on which the processing system can identify the target location (e.g., by temporarily storing information tying contact information to target location previously indicated using that contact information). In some implementations, the processing system may identify a database to query based on the target location.

Based on querying the data structure, the processing system may identify one or more employee names of employee(s) who are available within a threshold time period (e.g., the same day that the request is received, the next day, or within a threshold number of days). Additionally, or alternatively, the processing system may identify one or more time slots (e.g., of a specified duration, such as 30 minutes or 1 hour) during which those employee(s) are available for a meeting. In some implementations, the one or more time slots may be identified based on information obtained from an electronic calendar associated with employees, which may be stored in the availability database.

As shown by reference number 150, the processing system may transmit, to the mobile device, a message that indicates availability (e.g., the one or more time slots) of the one or more employees. As shown, the message may include the indication and/or a user interface element (e.g., a button or a link) with which the user can interact to select a time slot to schedule a meeting. Upon selection of the time slot, the mobile device may transmit a message indicating the select time slot (and/or the selected employee) to the processing system. The processing system may update the availability database (e.g., to mark the selected time as unavailable for a corresponding employee), may transmit a message to a device associated with the selected employee to notify the selected employee of the meeting (e.g., using an email address, updating a calendar, or the like), and/or may transmit a message using the contact information of the user to confirm the meeting and/or remind the user of the meeting.

In some implementations, the processing system may query the availability database prior to transmitting the message indicating the target location (e.g., described above in connection with FIG. 1C). In this case, the processing system may indicate time slots in that message. Alternatively, if there are no employees with availability, then the processing system may refrain from transmitting that message, which conserves computing resources and RF resources.

By using exchange data to determine a location of a user and to control transmission of messages to a mobile device of the user (e.g., rather than using GPS or base station trilateration), the processing system can determine a location of the user regardless of whether the user is carrying a mobile device, regardless of whether the mobile device is powered on, regardless of whether a GPS receiver of the mobile device is powered on, and regardless of whether the mobile device is in a location with sufficient GPS satellite coverage or base station coverage to perform trilateration. Thus, techniques described herein can be more reliable than GPS or base station trilateration and can be used for location determination in scenarios where GPS or base station trilateration is inaccurate or impossible. Furthermore, using exchange data for location determination conserves resources of the mobile device (e.g., processing resources, memory resources, and battery power) that are otherwise used to perform GPS or base station trilateration. Also, using exchange data for location determination conserves radio frequency resources that would otherwise be used for transmission of coordinates or other location data from the mobile device to a server (e.g., via a base station with which the mobile device communicates) if GPS or base station trilateration were to be used. Furthermore, the processing system may transmit a message to the mobile device only if multiple conditions are satisfied, as described above. This conserves radio frequency resources (e.g., time domain resources and frequency domain resources) that are used for telecommunication.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
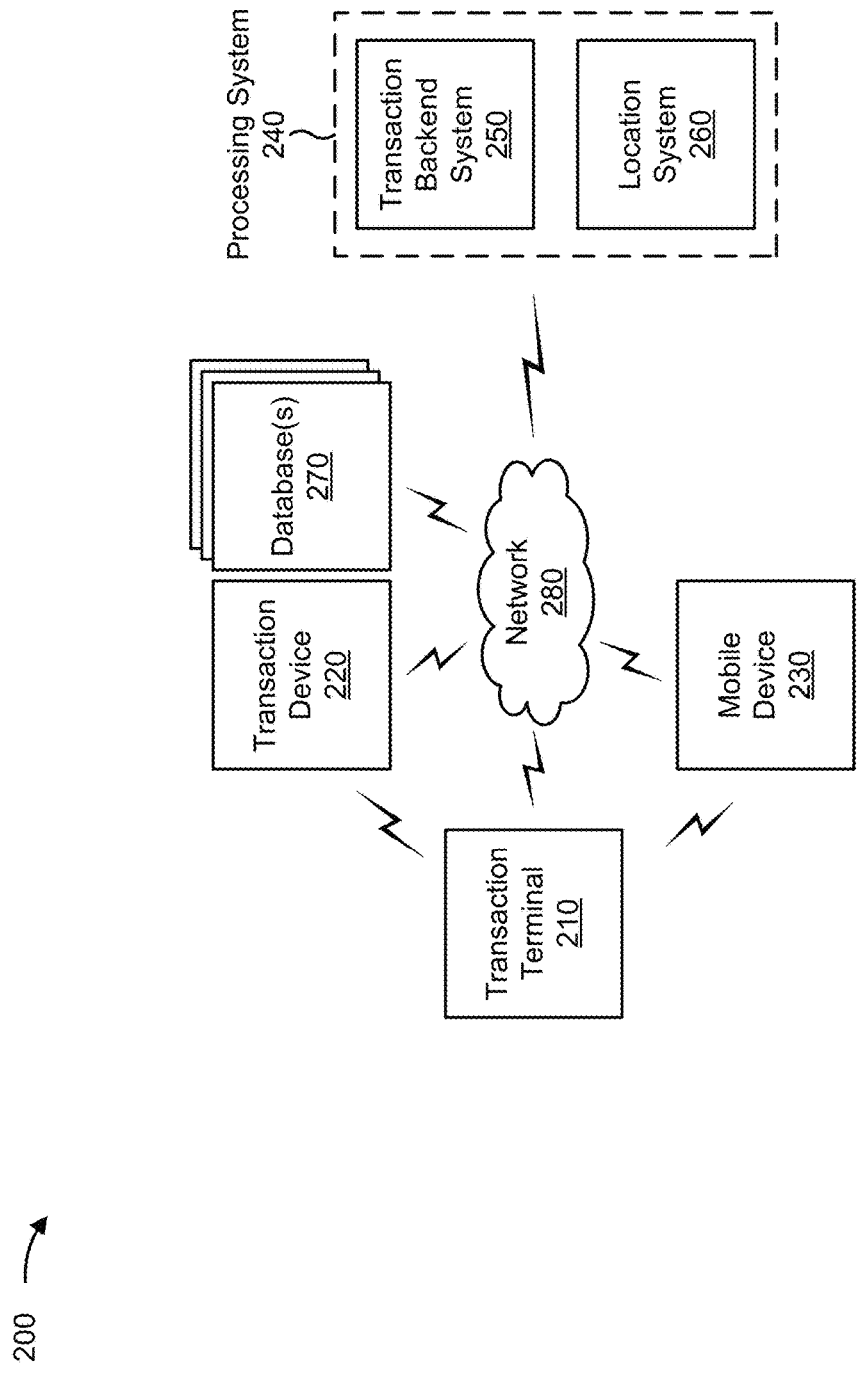
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a mobile device 230, a processing system 240, a transaction backend system 250, a location system 260, one or more databases 270, and a network 280. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (POS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or an RF signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the mobile device 230 or may be integrated into the mobile device 230. For example, the mobile device 230 may execute an electronic payment application capable of performing functions of the transaction device 220 described herein. Thus, one or more operations described herein as being performed by the transaction device 220 may be performed by a transaction card, the mobile device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The mobile device 230 includes a communication device and/or a computing device. For example, the mobile device 230 may include a wireless communication device, a mobile phone, user equipment, a tablet computer, a wearable communication device (e.g., a smart wristwatch, a pair of smart eyeglasses, a head mounted display, or a virtual reality headset), or a similar type of device.

The processing system 240 includes one or more servers and/or computing hardware (e.g., in a cloud computing environment or separate from a cloud computing environment) configured to perform location-based messaging, as described in more detail elsewhere herein. As shown in FIG. 2, in some implementations, the processing system includes the transaction backend system 250 and the location system 260. In some implementations, the transaction backend system 250 may perform transaction processing, such as by receiving and processing the exchange data described in connection with FIG. 1A, and the location system 260 may perform other operations associated with location-based messaging, as described in connection with FIGS. 1A-1D. In some implementations, the processing system 240 may be implemented as a computing platform that executes code.

The transaction backend system 250 includes one or more devices capable of processing, authorizing, and/or facilitating a transaction. For example, the transaction backend system 250 may include one or more servers and/or computing hardware (e.g., in a cloud computing environment or separate from a cloud computing environment) configured to receive and/or store information associated with processing an electronic transaction. The transaction backend system 250 may process a transaction, such as to approve (e.g., permit, authorize, or the like) or decline (e.g., reject, deny, or the like) the transaction and/or to complete the transaction if the transaction is approved. The transaction backend system 250 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 250 (e.g., for fraud detection).

The transaction backend system 250 may be associated with a financial institution (e.g., a bank, a lender, a credit card company, or a credit union) and/or may be associated with a transaction card association that authorizes a transaction and/or facilitates a transfer of funds. For example, the transaction backend system 250 may be associated with an issuing bank associated with the transaction device 220, an acquiring bank (or merchant bank) associated with the merchant and/or the transaction terminal 210, and/or a transaction card association (e.g., VISA® or MASTER-CARD®) associated with the transaction device 220. Based on receiving information associated with the transaction device 220 from the transaction terminal 210, one or more devices of the transaction backend system 250 may communicate to authorize a transaction and/or to transfer funds from an account associated with the transaction device 220 to an account of an entity (e.g., a merchant) associated with the transaction terminal 210.

The location system 260 includes one or more devices capable of receiving, generating, storing, processing, providing, and/or routing information associated with location-based messaging, as described elsewhere herein. The location system 260 may include a communication device and/or a computing device. For example, the location system 260 may include a server, such as an application server, a client server, a web server, a database server, a host server, a proxy server, a virtual server (e.g., executing on computing hardware), or a server in a cloud computing system. In some implementations, the location system 260 includes computing hardware used in a cloud computing environment.

The database(s) 270 include one or more devices capable of receiving, generating, storing, processing, and/or providing information associated with location-based messaging, as described elsewhere herein. The database 270 may include a communication device and/or a computing device. For example, the database 270 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 270 may communicate with one or more other devices of environment 200, as described elsewhere herein. The database 270 may include a single database or a collection of databases. For example, one or more databases 270 may include the location database, the user profile database, and/or the availability database described elsewhere herein.

The network 280 includes one or more wired and/or wireless networks. For example, the network 280 may include a cellular network, a public land mobile network, a local area network, a wide area network, a metropolitan area network, a telephone network, a private network, the Internet, and/or a combination of these or other types of networks. The network 280 enables communication among the devices of environment 200. In some implementations, the transaction terminal 210 may communicate with the transaction device 220 using a first network (e.g., a contactless network or by coming into contact with the transaction device 220) and may communicate with the processing system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
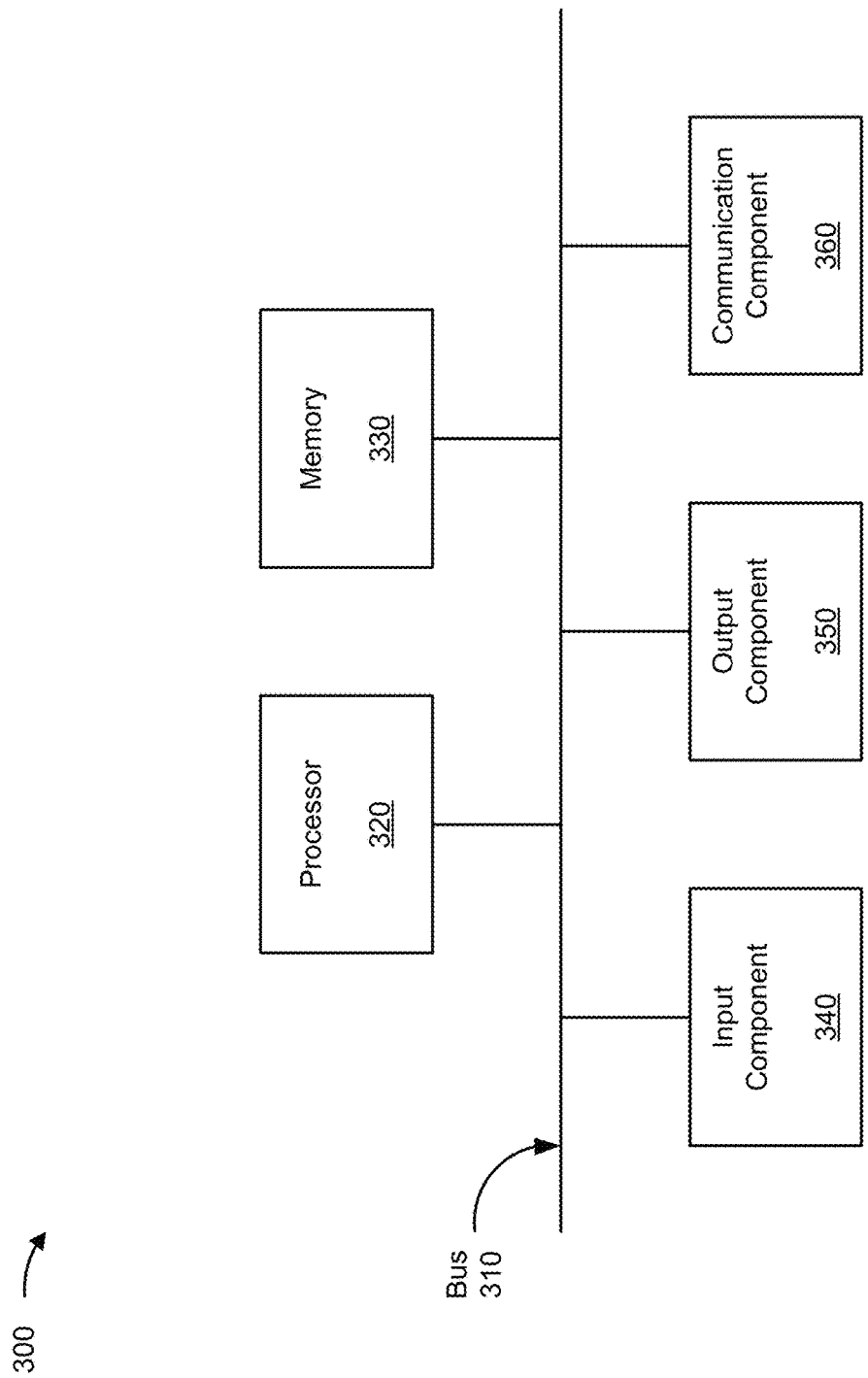
FIG. 3 is a diagram of example components of one or more devices of FIG. 2.

FIG. 3 is a diagram of example components of a device 300, which may correspond to the transaction terminal 210, the transaction device 220, the mobile device 230, the processing system 240, the transaction backend system 250, the location system 260, and/or the database(s) 270. In some implementations, the transaction terminal 210, the transaction device 220, the mobile device 230, the processing system 240, the transaction backend system 250, the location system 260, and/or the database(s) 270 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
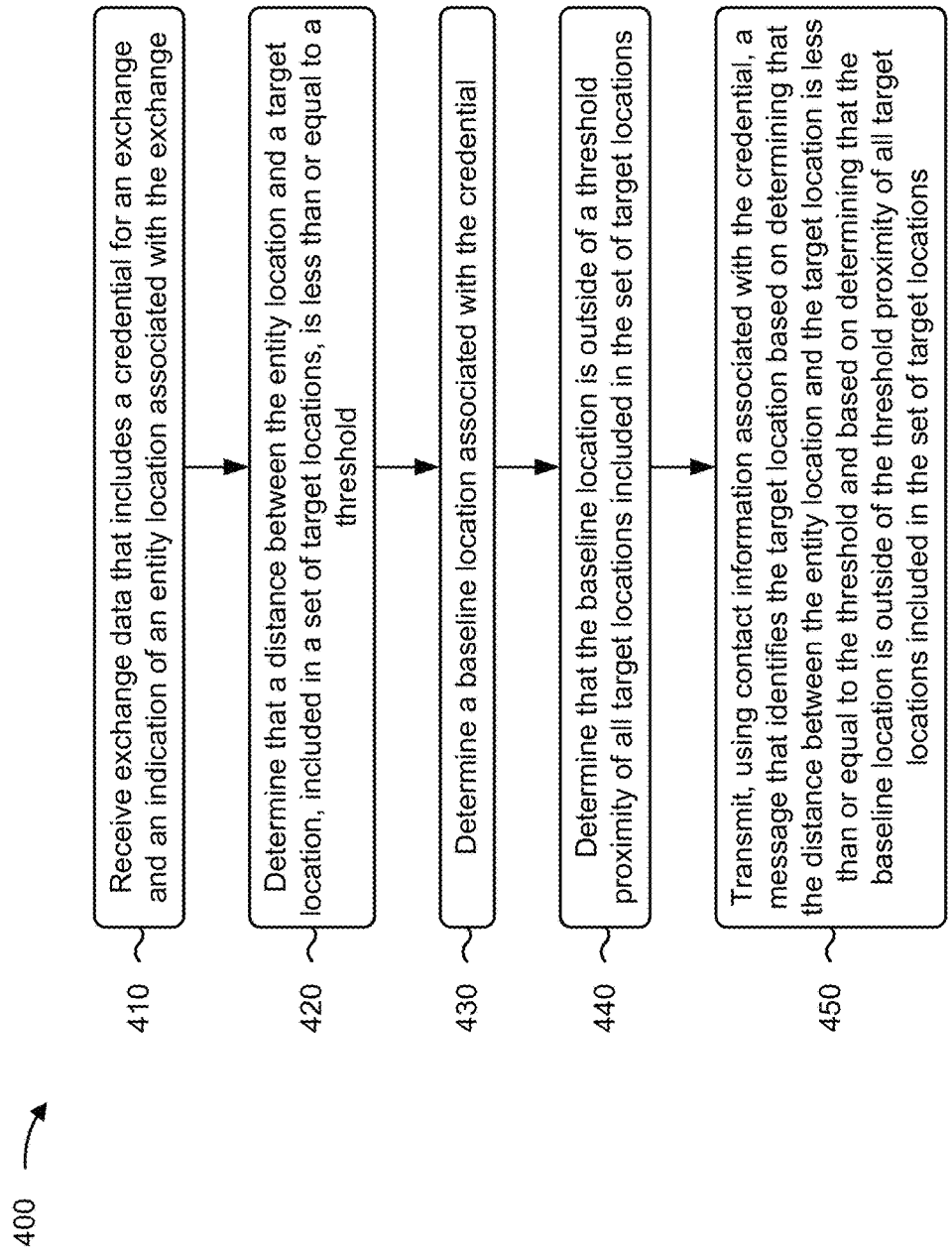
FIG. 4 is a flowchart of an example process relating to location-based messaging.

FIG. 4 is a flowchart of an example process 400 associated with location-based messaging. In some implementations, one or more process blocks of FIG. 4 may be performed by a processing system (e.g., processing system 240). In some implementations, one or more process blocks of FIG. 4 may be performed by another device or a group of devices separate from or including the processing system, such as the transaction backend system and/or the location system 260. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving exchange data that includes a credential for an exchange and an indication of an entity location associated with the exchange (block 410). As further shown in FIG. 4, process 400 may include determining that a distance between the entity location and a target location, included in a set of target locations, is less than or equal to a threshold (block 420). As further shown in FIG. 4, process 400 may include determining a baseline location associated with the credential (block 430). As further shown in FIG. 4, process 400 may include determining that the baseline location is outside of a threshold proximity of all target locations included in the set of target locations (block 440). As further shown in FIG. 4, process 400 may include transmitting, using contact information associated with the credential, a message that identifies the target location based on determining that the distance between the entity location and the target location is less than or equal to the threshold and based on determining that the baseline location is outside of the threshold proximity of all target locations included in the set of target locations (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for location-based messaging, comprising:
   receiving, by a system, exchange data associated with a user and an indication of an exchange location;
   determining, by the system, that the exchange location satisfies a first threshold based on the exchange location being within a threshold distance from at least one baseline location associated with the user;
   determining, by the system and based at least in part on the exchange location satisfying the first threshold, a set of target locations satisfying a second threshold indicating the set of target locations is within a threshold proximity from the exchange location;
   determining, by the system, each target location of a subset of target locations of the set of target locations satisfies the first threshold based on each target location of the subset of target locations being within the threshold distance from the at least one baseline location; and
   transmitting, by the system, to a user device associated with the user, a message including an indication of the subset of target locations based on determining that each of the target locations satisfies the first threshold and the second threshold.

2. The method of claim 1, wherein the second threshold is based at least in part on a scaling factor corresponding to a location type associated with the set of target locations.

3. The method of claim 1, wherein the exchange location is a location of a merchant or a location of an automated teller machine.

4. The method of claim 1, wherein determining the set of target locations comprises:
   searching a data structure that includes information identifying the set of target locations; and
   identifying the subset of target locations of the set of target locations located nearest the exchange location, as compared to at least one other target location included in the set of target locations, based on searching the data structure.

5. The method of claim 1, wherein determining each target location of the subset of target locations satisfies the first threshold comprises:
   identifying a target location of the subset of target locations that is located nearest to the at least one baseline location, as compared to all other target locations included in the subset of target locations, based on searching a data structure;
   determining a distance between the at least one baseline location and the target location based on identifying the target location; and
   determining the at least one baseline location is outside of the threshold proximity of all target locations included in the subset of target locations based on the distance between the at least one baseline location and the target location.

6. The method of claim 1, further comprising identifying the set of target locations based on a user profile associated with the user or historical exchange data associated with the user.

7. The method of claim 1, wherein the at least one baseline location is associated with a home location of the user, a work location of the user, or a geographic location derived from historical exchange data of the user.

8. A non-transitory computer-readable medium storing a set of instructions for location-based messaging, the set of instructions comprising:
   one or more instructions that, when executed by one or more processors of a system, cause the system to:
      receive exchange data associated with a user device and an indication of an exchange location;
      determine whether the exchange location satisfies a first threshold based on the exchange location being within a threshold distance from at least one baseline location associated with the user device;
      determine, based at least in part on the exchange location satisfying the first threshold, a set of target locations satisfying a second threshold indicating the set of target locations is within a threshold proximity from the exchange location;
      determine whether each target location of a subset of target locations of the set of target locations satisfies the first threshold based on each target location of the subset of target locations being within the threshold distance from the at least one baseline location; and
      transmit, to the user device, a message including an indication of the subset of target locations based on determining that each of the target locations satisfies the first threshold and the second threshold.

9. The non-transitory computer-readable medium of claim 8, wherein the user device is associated with a user, and wherein the one or more instructions, when executed by the one or more processors, further cause the system to:
   identify the at least one baseline location based at least in part on a user profile associated with the user.

10. The non-transitory computer-readable medium of claim 8, wherein the exchange location is a location of a merchant or a location of an automated teller machine.

11. The non-transitory computer-readable medium of claim 8, wherein to determine the set of target locations, the one or more instructions, when executed by the one or more processors, cause the system to:
    search a data structure that includes information identifying the set of target locations; and
    identify the subset of target locations of the set of target locations located nearest the exchange location, as compared to at least one other target location included in the set of target locations, based on searching the data structure.

12. The non-transitory computer-readable medium of claim 8, wherein to determine each target location of the subset of target locations satisfies the first threshold, the one or more instructions, when executed by the one or more processors, cause the system to:
    identify a target location of the subset of target locations that is located nearest to the at least one baseline location, as compared to all other target locations included in the subset of target locations, based on searching a data structure; and
    determine the at least one baseline location is outside of the threshold proximity of all target locations included in the subset of target locations based on a distance between the at least one baseline location and the target location.

13. The non-transitory computer-readable medium of claim 8, wherein the user device is associated with a user, and wherein the one or more instructions, when executed by the one or more processors, further cause the system to:
    identify the set of target locations based on a user profile associated with the user or historical exchange data associated with the user.

14. The non-transitory computer-readable medium of claim 8, wherein the user device is associated with a user, and wherein the at least one baseline location is associated with a home location of the user, a work location of the user, or a geographic location derived from historical exchange data of the user.

15. A device, comprising:
one or more memories; and
one or more processors, coupled to the one or more memories, configured to:
receive exchange data associated with a user device and an indication of an exchange location;
determine whether the exchange location satisfies a first threshold based on the exchange location being within a threshold distance from at least one baseline location associated with the user device;
determine, based at least in part on the exchange location satisfying the first threshold, a set of target locations satisfying a second threshold indicating the set of target locations is within a threshold proximity from the exchange location;
determine each target location of a subset of target locations of the set of target locations satisfies the first threshold based on each target location of the subset of target locations being within the threshold distance from the at least one baseline location; and
transmit, to the user device, a message including an indication of the subset of target locations based on determining that each of the target locations satisfies the first threshold and the second threshold.

16. The device of claim 15, wherein the user device is associated with a user, and wherein the one or more processors are further configured to:
identify the at least one baseline location based at least in part on a user profile associated with the user.

17. The device of claim 15, wherein the exchange location is a location of a merchant or a location of an automated teller machine.

18. The device of claim 15, wherein to determine the set of target locations, the one or more processors are configured to:
search a data structure that includes information identifying the set of target locations.

19. The device of claim 15, wherein to determine that each target location of the subset of target locations satisfies the first threshold, the one or more processors are configured to:
identify a target location of the subset of target locations that is located
nearest to the at least one baseline location, as compared to all other target
locations included in the subset of target locations.

20. The device of claim 15, wherein the one or more processors are further configured to:
identify the set of target locations based on a user profile associated with the user device or historical exchange data associated with the user device.

\* \* \* \* \*